(12) United States Patent
Takeshima et al.

(10) Patent No.: US 7,730,986 B2
(45) Date of Patent: Jun. 8, 2010

(54) ELECTRIC COMPONENT ARRANGEMENT STRUCTURE FOR VEHICLE, VEHICLE HAVING THE SAME, AND METHOD FOR ARRANGING ELECTRIC COMPONENT IN VEHICLE

(75) Inventors: Masao Takeshima, Wako (JP); Hitoshi Furuhashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 11/867,947

(22) Filed: Oct. 5, 2007

(65) Prior Publication Data
US 2008/0257632 A1  Oct. 23, 2008

(30) Foreign Application Priority Data
Oct. 31, 2006  (JP) ............................. 2006-296920

(51) Int. Cl.
*B60R 16/04* (2006.01)
(52) U.S. Cl. .................. 180/68.5; 180/291; 180/311
(58) Field of Classification Search .................. 180/291, 180/193, 68.5, 311, 312
See application file for complete search history.

(56) References Cited
U.S. PATENT DOCUMENTS

| | | | | |
|---|---|---|---|---|
| 6,702,058 B2 * | 3/2004 | Ishii et al. .................... 180/311 |
| 7,216,733 B2 * | 5/2007 | Iwami et al. ................ 180/68.1 |
| 7,232,171 B2 * | 6/2007 | Lan et al. .................... 296/37.1 |
| 7,306,069 B2 * | 12/2007 | Takeshima et al. ........... 180/312 |
| 7,311,170 B2 * | 12/2007 | Isoda et al. .................. 180/296 |
| 7,374,009 B2 * | 5/2008 | Yamamoto et al. ........... 180/291 |
| 2005/0225057 A1 | 10/2005 | Yamamoto et al. |
| 2007/0075845 A1 * | 4/2007 | Kawamura et al. ........ 340/425.5 |

FOREIGN PATENT DOCUMENTS

JP    2005-280578    10/2005

\* cited by examiner

*Primary Examiner*—S. Joseph Morano
*Assistant Examiner*—John D Walters
(74) *Attorney, Agent, or Firm*—Ditthavong Mori & Steiner, P.C.

(57) ABSTRACT

An electric component arrangement structure for a vehicle includes a plurality of electric components, a support member, and a body frame of the vehicle. The plurality of electric components includes a battery and an ECU. Couplers of the electric components are arranged in the support member. The body frame includes a main frame which supports an engine. The plurality of electric components are arranged in the body frame. The main frame supports the support member at a front region located forward with respect to the engine. The main frame supports the battery and the ECU at a rear region located rearward with respect to the engine.

19 Claims, 7 Drawing Sheets

ELECTRIC COMPONENT ARRANGEMENT STRUCTURE FOR VEHICLE, VEHICLE HAVING THE SAME, AND METHOD FOR ARRANGING ELECTRIC COMPONENT IN VEHICLE

CROSS-REFERENCE TO RELATED APPLICATIONS

The present application claims priority under 35 U.S.C. §119 to Japanese Patent Application No. 2006-296920, filed Oct. 31, 2006, entitled "Electric Component Arrangement Structure For Vehicle." The contents of this application are incorporated herein by reference in their entirety.

BACKGROUND OF THE INVENTION

1. Field of the Invention

The present invention relates to an electric component arrangement structure for a vehicle, a vehicle having the electric component arrangement structure, and a method for arranging an electric component in a vehicle.

2. Discussion of the Background

As an electric component arrangement structure, an ECU of an engine is supported and couplers of respective electric components are arranged in a case of the ECU in a concentrated manner, in a sub-frame part of a body frame that is located in front of a main frame part for supporting the engine and supports a steering shaft (for example, refer to Japanese Unexamined Patent Application Publication No. 2005-280578 A). The contents of Japanese Unexamined Patent Application Publication No. 2005-280578 A are incorporated herein by reference in their entirety.

In a conventional structure, the arrangement of a plurality of electric components around the steering shaft on the front side of the vehicle body has an impact on a weight balance between the front side and the rear side of the vehicle body.

SUMMARY OF THE INVENTION

According to one aspect of the present invention, an electric component arrangement structure for a vehicle includes a plurality of electric components, a support member, and a body frame of the vehicle. The plurality of electric components includes a battery and an ECU. Couplers of the electric components are arranged in the support member. The body frame includes a main frame which supports an engine. The plurality of electric components are arranged in the body frame. The main frame supports the support member at a front region located forward with respect to the engine. The main frame supports the battery and the ECU at a rear region located rearward with respect to the engine.

According to another aspect of the present invention, a vehicle includes an engine, a plurality of electric components, a support member, and a body frame of the vehicle. The plurality of electric components includes a battery and an ECU. Couplers of the electric components are arranged in the support member. The body frame includes a main frame which supports the engine. The plurality of electric components are arranged in the body frame. The main frame supports the support member at a front region located forward with respect to the engine. The main frame supports the battery and the ECU at a rear region located rearward with respect to the engine.

According to further aspect of the present invention, a method for arranging an electric component in a vehicle includes providing a plurality of electric components comprising a battery and an ECU. Couplers of the electric components are arranged in a support member. An engine is supported on a main frame of a body frame of the vehicle. The plurality of electric components are arranged in the body frame. The support member is supported on the main frame at a front region located forward with respect to the engine. The battery and the ECU are supported on the main frame at a rear region located rearward with respect to the engine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

In an electric component arrangement structure for a vehicle (for example, a saddle-ride type four-wheeled vehicle 1) according to one embodiment of the present invention, a plurality of electric components are arranged in a body frame (for example, a body frame 4) and couplers of the respective electric components are arranged, in a concentrated manner, in a support member (for example, a support member 71) supported by the body frame. The body frame includes a main frame (for example, a main frame 39) for supporting an engine (for example, an engine 5) and the like. The main flame also supports the support member at a region located in front of the engine in the main frame (i.e., at a front region located forward with respect to the engine), and supports a battery (for example, a battery 75) and an ECU (for example, an ECU 76) among the respective electric components at regions located in the rear of the engine in the main frame (i.e., at a rear region located rearward with respect to the engine).

In an electric component arrangement structure for a vehicle according to another embodiment of the present invention, the main frame includes upper frames (for example, upper frames 31), front-side down frames (for example, front-side down frame parts 35), lower frames (for example, lower frames 32), and rear-side down frames (for example, rear-side down frames 36). The support member is supported by the upper frames and the front-side down frames. The battery is supported by the upper frames.

In an electric component arrangement structure for a vehicle according to another embodiment of the present invention, the ECU is supported by a case (for example, a case 78a) of the battery.

Hereinafter, an embodiment of the present invention will be described for further details with reference to the drawings. It should be noted that the directions of front, rear, left, right, and the like in the following description are the same as those of a vehicle unless otherwise described. Further, arrows FR, LH, and UP in the drawings indicate the front, left, and upper of the vehicle, respectively. A saddle-ride type four-wheeled vehicle (vehicle) 1 shown in FIG. 1 includes left and right front wheels 2 and rear wheels 3, all of which are low-pressure balloon tires each having a relatively large diameter, in the front and rear of the downsized and light-weight vehicle body, and is configured as an ATV (All Terrain Vehicle) in which the running through performance on an irregular terrain is enhanced by securing a large ground clearance.

Figure 1:
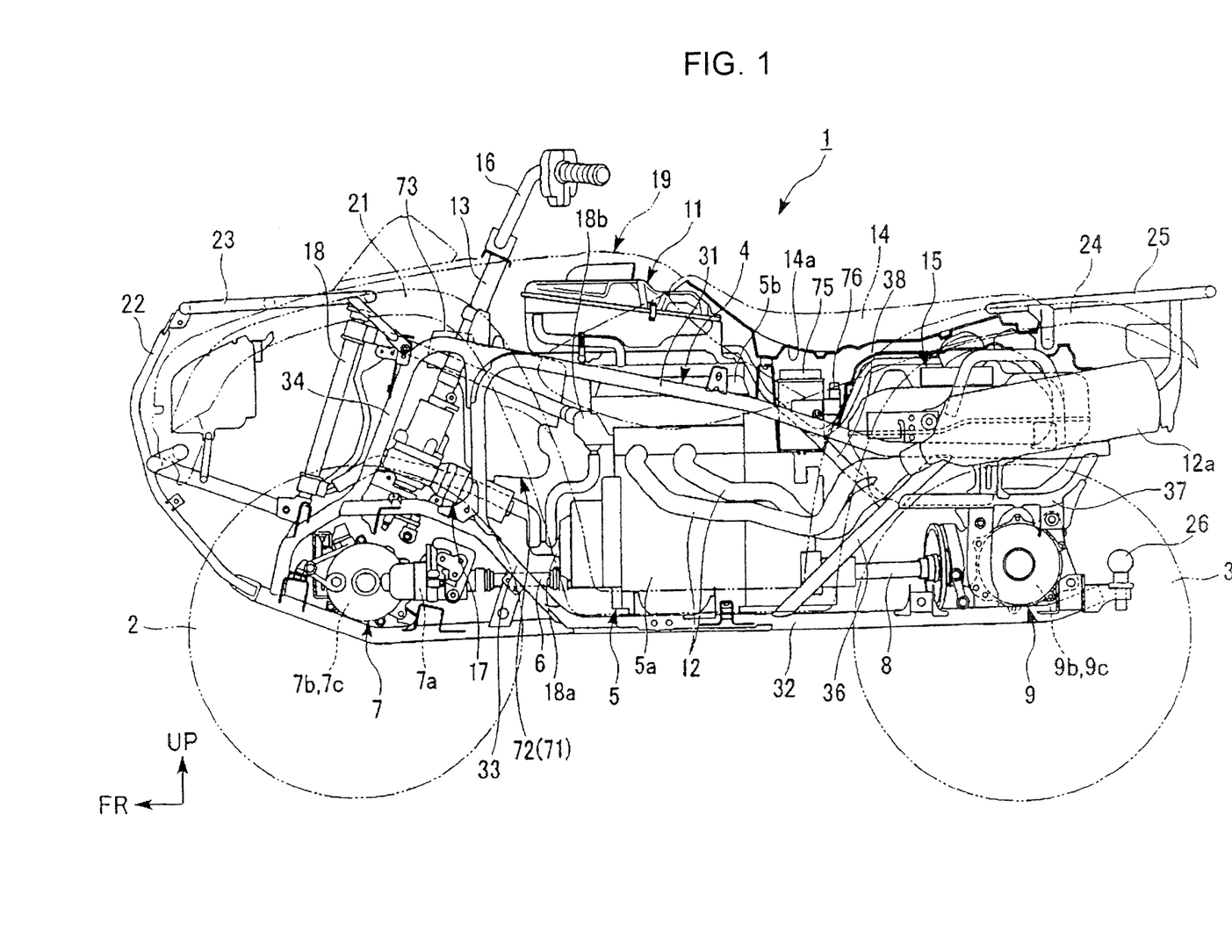
FIG. 1 is a side view of a saddle-ride type four-wheeled vehicle according to an embodiment of the present invention.

A body frame 4 of the saddle-ride type four-wheeled vehicle 1 forms a long box structure extending in the front-rear direction at a middle portion in the vehicle-width direction (left-right direction). An independent front suspension (not shown) is supported at a front portion of the body frame 4, and an independent rear suspension (not shown) is similarly supported at a rear portion thereof.

An engine (internal combustion engine) 5 as a power plant of the vehicle is mounted at a substantially middle portion of the body frame 4. The engine 5 is, for example, a water-cooled two-cylinder engine, and is vertically laid out so that a rotational axis line of a crankshaft is directed in the front-rear direction. A crankcase 5a configuring a lower portion of the engine 5 also serves as a transmission case, and front and rear propeller shafts 6 and 8 are derived from the lower front side and the lower rear side of the crankcase 5a toward the front and rear, respectively.

The respective propeller shafts 6 and 8 allow for power transmission to the left and right front wheels 2 and rear wheels 3 through front and rear final assemblies 7 and 9 supported at the front lower side and the rear lower side of the body frame 4, respectively, and through a drive shaft (not shown). Specifically, a rotational drive power from the engine 5 is output to the respective propeller shafts 6 and 8 through a transmission (not shown) in the crankcase 5a, and then is transmitted to the left and right front wheels 2 and rear wheels 3 through the respective final assemblies 7 and 9, and the like.

A two-wheel-drive/four-wheel-drive switching mechanism 7a by which a rotational drive power from the front propeller shaft 6 can be connected or disconnected is accommodated in a rear portion of a casing of the front final assembly 7, and a differential mechanism 7b which can absorb a difference in rotational speed between left and right drive shafts (the left and right front wheels 2), and a differential lock switching mechanism 7c which can lock the differential are accommodated in a front portion of the casing. On the other hand, a differential mechanism 9b which can absorb a difference in rotational speed between left and right drive shafts (the left and right rear wheels 3), and a differential lock switching mechanism 9c which can lock the differential are accommodated in a casing of the rear final assembly 9.

A cylinder part 5b is provided in an erect manner on the crankcase 5a of the engine 5, and an air cleaner device 11 for engine intake is arranged immediately above the cylinder part 5b. Outside air filtered in the air cleaner device 11 is taken in the inside of the cylinder from the right side of the cylinder part 5b through a throttle body (not shown). Exhaust air from the inside of the cylinder is derived to the outside of the cylinder through exhaust pipes 12 connected to the left side of the cylinder part 5b. The exhaust pipes 12 are bent on the left side of the cylinder part 5b to extend to the rear, and are connected to a silencer 12a arranged on the rear left side of the vehicle body.

A steering shaft 13, the air cleaner device 11, and a saddle-ride type seat 14 for a rider are arranged, in the order from the front side, at upper portions of the body frame 4, and a fuel tank 15 is arranged below a rear portion of the seat 14. A bar-type handlebar 16 is attached to an upper end of the steering shaft 13, knuckles (not shown) of the left and right front wheels 2 are coupled to a lower end of the steering shaft 13 through left and right tie rods and the like, and a steering angle can be applied to the left and right front wheels 2 by rotational operation of the handlebar 16.

An electric motor-integrated actuator unit 17 is provided at a lower portion of the steering shaft 13, so that an electric power steering device for applying a steering assist power to a steering system by using the electric motor as a drive source is configured. A radiator 18 for cooling the engine is arranged in front of a lower portion of the steering shaft 13. It should be noted that the reference numerals 18a and 18b in the drawing denote a water pump arranged on the front side of the crankcase 5a and a thermostat arranged on the front side of the cylinder part 5b of the engine 5, respectively.

A front vehicle body cover 19 made of resin which appropriately covers a front portion of the vehicle body, front fenders 21 similarly made of resin which cover the left and right front wheels 2 from the above to the rear, and a front protector 22 and a front carrier 23, both of which are mainly made of steel are attached to front portions of the body frame 4. Further, rear fenders 24 made of resin which cover the left and right rear wheels 3 from the above to the front, and a rear carrier 25 and a trailer hitch 26, both of which are mainly made of steel are attached to rear portions of the body frame 4.

Figure 2:
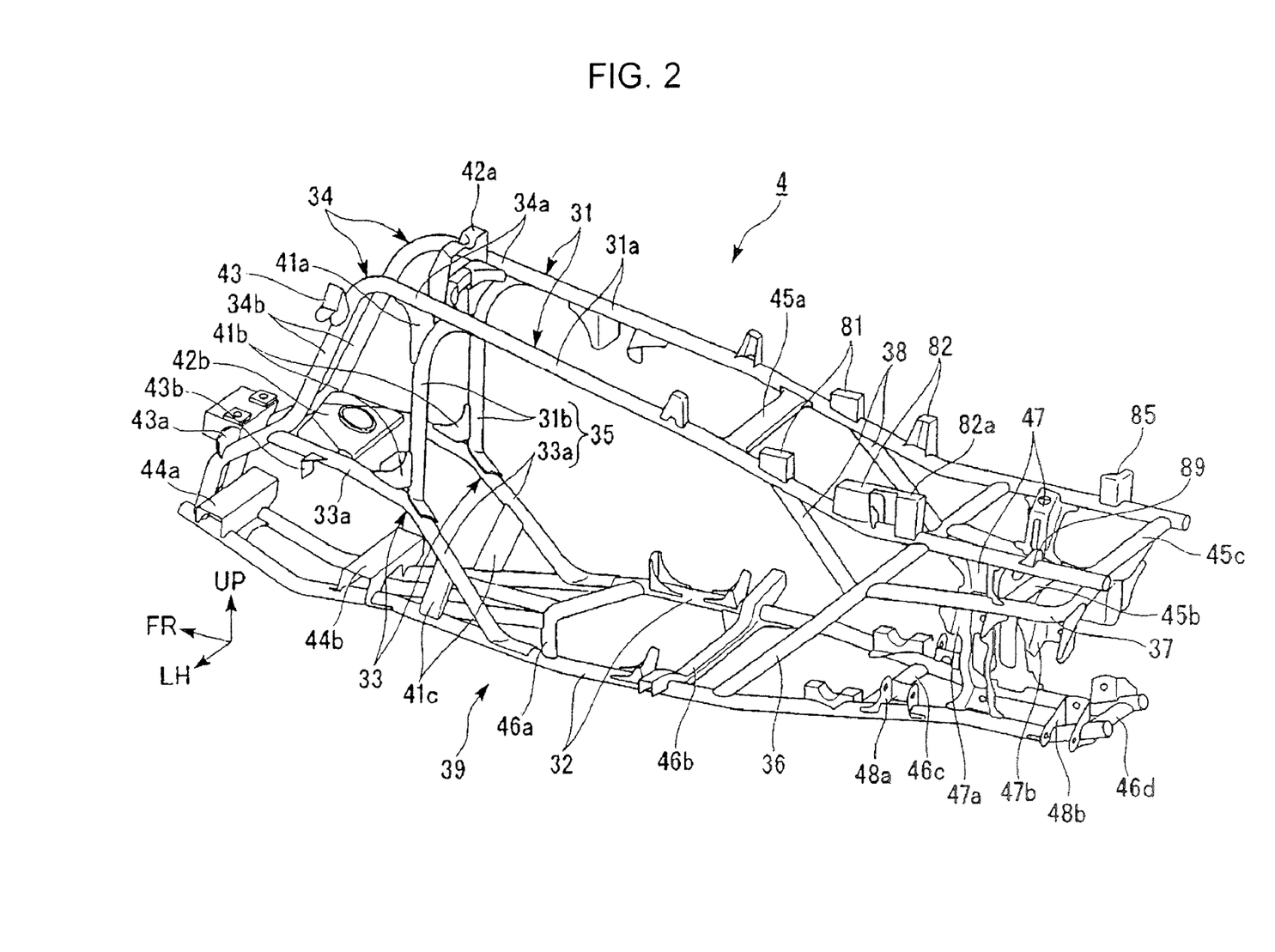
FIG. 2 is a perspective view of a body frame of the saddle-ride type four-wheeled vehicle.

With reference to FIG. 2 together, the body frame 4 is formed by integrally coupling a plurality of kinds of steel materials by welding, and the like. Specifically, the body frame 4 forms a pair of left and right closed-loop structures by using left and right upper frames 31 and left and right lower frames 32, and the like. By coupling the closed-loop structures to each other through a plurality of cross members, a long box structure extending in the front-rear direction is formed at a middle portion in the vehicle-width direction.

Each upper frame 31 includes an upper inclined part 31a which extends slightly downward to the rear on the outer side of an upper portion of the body frame 4 and a front drooping part 31b which extends downward from a front end of each upper inclined part 31a, and is integrally formed by bending a single steel pipe. On the other hand, each lower frame 32 is arranged in a substantially horizontal direction on the outer side of a lower portion of the body frame 4, and is integrally formed by bending a single steel pipe. The lower frames 32 are moderately bent so that a distance between intermediate portions in the front-rear direction becomes maximum, and a distance between front portions and a distance between rear portions are reduced. A front end and a rear end of each lower frame 32 are bent upward to the front and upward to the rear, respectively.

A front lower sub-frame 33 extends upward to the front from the front side of an intermediate portion of each lower frame 32. Each front lower sub-frame 33 is formed in a bent manner so that a front inclined part 33b thereof is moderately inclined as compared to a rear inclined part 33a thereof. A front sub-frame 34 extends toward a front end of each lower frame 32, while being appropriately bent, from the front side of the upper inclined part 31a of each upper frame 31. Each front sub-frame 34 forms an upper inclined part 34a extending substantially in parallel to the upper inclined part 31a from the front side of the upper inclined part 31a of each upper frame 31, and then forms a front drooping part 34b which is bent downward to extend diagonally downward to the front. Each front drooping part 34 forms a crank shape in such a manner that each lower side thereof is moderately changed to the front to reach a front end of the lower frame 32.

A front end of each front lower sub-frame 33 is connected to the crank-shaped portion of the front drooping part 34b of each front sub-frame 34 at the rear side, and a lower end of the front drooping part 31b of each upper frame 31 is connected to an intermediate portion, in the front-rear direction, of each front lower sub-frame 33 at the upper side. It should be noted that a region configured by connecting the front drooping part 31b of each upper frame 31 to the rear inclined part 33a of each front lower sub-frame 33 is referred to as a front-side down frame part 35 in some cases.

A rear support frame (hereinafter, referred to as a rear-side down frame in some cases) 36 which is inclined upward to the rear is provided between a rear portion of each upper frame 31 and the rear side of an intermediate portion of each lower frame 32. A rear sub-frame 37 extends to the rear from an upper portion of each rear support frame 36, and a rear end of each rear sub-frame 37 is bent upward to be connected to a rear end of each upper frame 31 at the lower side. A rear gusset frame 38 which is inclined upward to the rear is provided between an upper portion of each rear support frame 36 and an intermediate portion of each upper frame 31. The upper frames 31, the front-side down frame parts 35, the lower frames 32, and the rear-side down frames 36 form a pair of left and right closed-loop structures, the inside of which configures a main frame 39 for supporting the engine 5.

It should be noted that the reference numeral 41a denotes an upper gusset provided between a bent portion between the upper inclined part 31a and the front drooping part 31b of each upper frame 31, and the upper inclined part 34a of each front sub-frame 34, the reference numeral 41b denotes a middle gusset provided between the front drooping part 31b of each upper frame 31 and the front inclined part 33b of each front lower sub-frame 33, the reference numeral 41c denotes a lower gusset provided between the rear inclined part 33a of each front lower sub-frame 33 and a front portion of each lower frame 32, the reference numeral 42a denotes a bracket for supporting an upper portion of the steering shaft 13 provided between the upper inclined parts 34a of the front sub-frames 34, and the reference numeral 42b denotes a plate for supporting a lower portion of the steering shaft 13 provided between the front inclined parts 33b of the front lower sub-frames 33.

Further, the reference numeral 43 denotes a bracket for supporting an upper portion of a cushion, fixed to the front drooping part 34b of each front sub-frame 34, the reference numeral 43a denotes a cross member for supporting a front portion of an upper arm, provided between the crank-shaped portions of the front drooping parts 34b of the front sub-frames 34, the reference numeral 43b denotes a bracket for supporting a rear portion of the upper arm, fixed to the front inclined part 33b of each front lower sub-frame 33, the reference numeral 44a denotes a cross member for supporting a front portion of a lower arm, provided between front ends of the lower frames 32, the reference numeral 44b denotes a cross member for supporting a rear portion of the lower arm, provided between front portions of the lower frames 32.

Furthermore, the reference numeral 45a denotes a center upper-cross-member provided between intermediate portions of the upper frames 31, the reference numeral 45b denotes a rear upper-cross-member provided between intermediate portions of the rear sub-frames 37, the reference numeral 45c denotes a rear end upper-cross-member provided between rear ends of the upper frames 31, the reference numeral 46a denotes a center lower-cross-member provided between the front sides of intermediate portions of the lower frames 32, the reference numeral 46b denotes a step-part cross member provided between the rear sides of intermediate portions of the lower frames 32, the reference numeral 46c denotes a rear lower-cross-member provided between rear portions of the lower frames 32, and the reference numeral 46d denotes a rear end lower-cross-member provided between rear ends of the lower frames 32.

Further, the reference numeral 47 denotes a bracket for supporting an upper portion of the cushion, provided between a rear portion of each upper frame 31 and an intermediate portion of each rear sub-frame 37, the reference numeral 47a denotes a bracket for supporting a front portion of the upper arm, provided between an intermediate portion of each rear sub-frame 37 and a rear portion of each lower frame 32, the reference numeral 47b denotes a bracket for supporting a rear portion of the upper arm, fixed to a rear portion of each rear sub-frame 37, the reference numeral 48a denotes a bracket for supporting a front portion of the lower arm, fixed to a rear portion of each lower frame 32, and the reference numeral 48b denotes a bracket for supporting a rear portion of the lower arm, fixed to a rear end of each lower frame 32.

Figure 3:
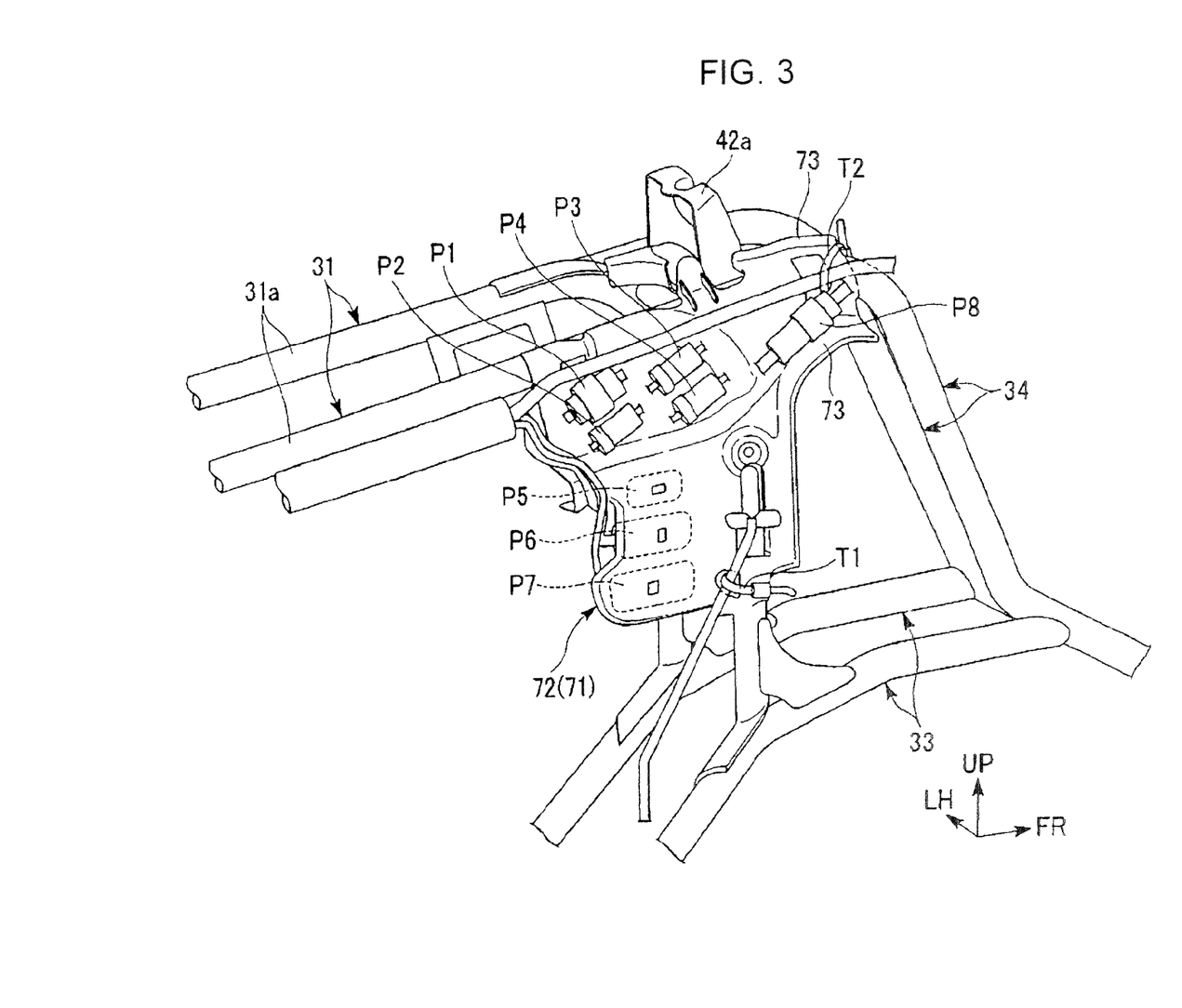
FIG. 3 is a perspective view around a coupler support member attached to a right front portion of the body frame, viewed from the right rear side.
Figure 4:
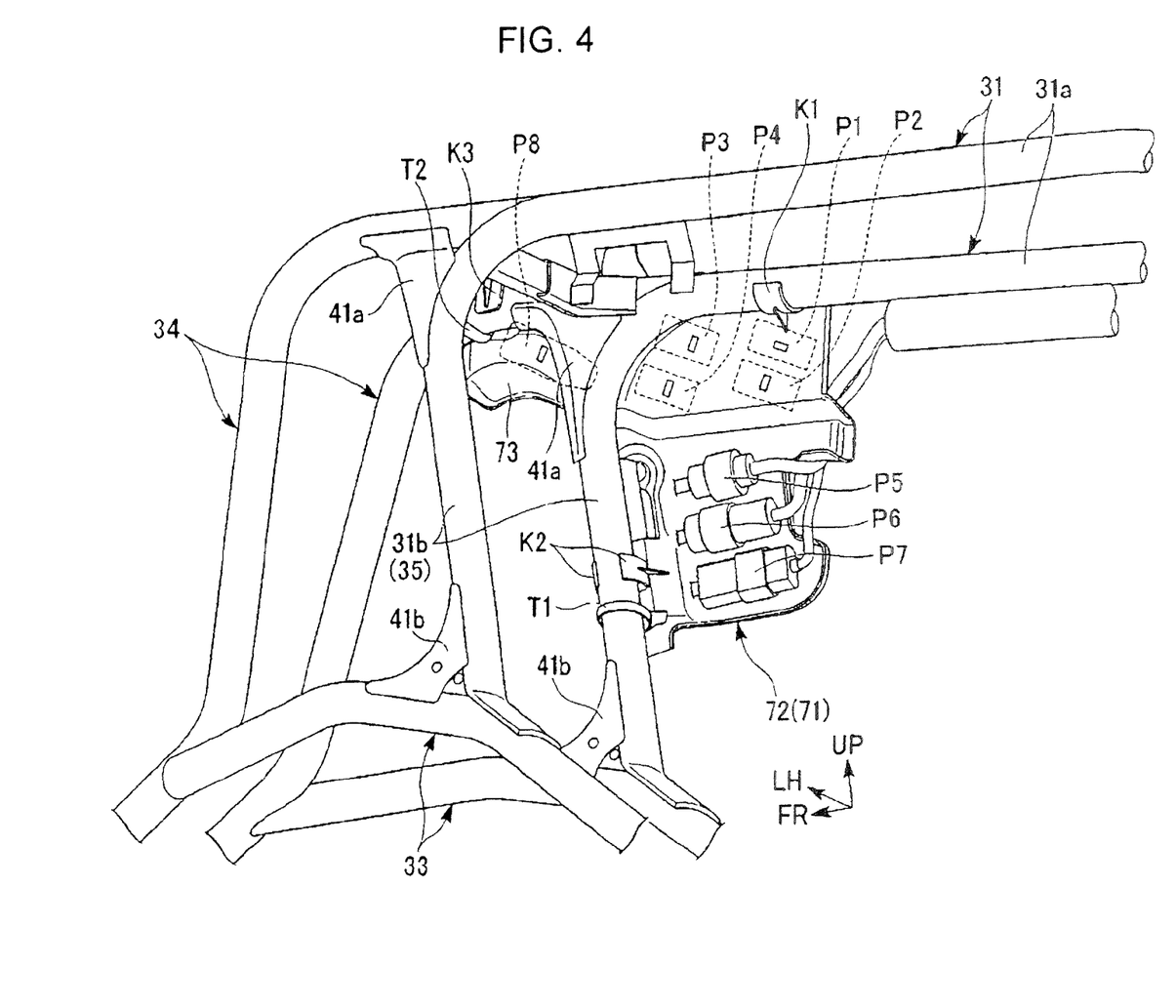
FIG. 4 is a perspective view around the support member, viewed from the left rear side.

As shown in FIGS. 3 and 4, a support member 71 for supporting couplers of respective electric components is provided on the front right side of the main frame 39 of the body frame 4 to straddle the upper frames 31 and the front-side down frame parts 35. The support member 71 is made of, for example, a synthetic resin, and is formed in a plate shape substantially orthogonal to the left-right direction. The support member 71 is arranged in such a manner that its upper edge is directed along the upper frames 31 and its front edge is directed along the front-side down frame parts 35. By providing the support member 71, a support plate 72 for supporting the couplers of the respective electric components is formed in a range of a substantially rectangular shape viewed from the lateral side under front portions of the upper frames 31 and in the rear of upper portions of the front-side down frame parts 35.

The support plate 72 is located in front relative to the engine 5 supported by the main frame 39, and is located more rearward relative to the steering shaft 13 (see FIG. 1). The support plate 72 is formed in such a manner that its lower portion is changed outside in the vehicle-width direction relative to its upper portion. For example, a coupler P1 for a handle switch harness, a coupler P2 for a bank angle sensor harness, and couplers P3 and P4 for mode (shift) switch harnesses are attached, while forming two lines, to the outside of upper portions of the support plate 72 in the vehicle-width direction. For example, a coupler P5 for a shift drum position switch harness, a coupler P6 for an ACG (an alternating current generator or an alternator) harness, and a coupler P7 for a power steering motor harness are attached up and down to the inside of lower portions of the support plate 72 in the vehicle-width direction.

The support member 71 is attached to the front right side of the main frame 39 from the outside of the vehicle-width direction. An upper engaging pawl K1 engaged with the upper frame 31 is provided on the upper rear side of the support member 71 on the inside in the vehicle-width direction. A lower engaging pawl K2 engaged with the front-side down frame part 35 is provided on the front lower side of the support member 71 on the inside in the vehicle-width direction. A lower end of the support member 71 is fixed to the front-side down frame part 35 by using a banding band T1.

A front extension part 73 extending forward so as to be directed along a front sub-pipe 88 is provided on the front side of the front portion of the support member 71, and a coupler P8 for a combination switch harness is attached to the outside of the front extension part 73 in the vehicle-width direction. A front engaging pawl K3 engaged with the front sub-pipe 88 is provided on the inside of the front extension part 73 in the vehicle-width direction. A front end of the front extension part 73 is fixed to the front sub-pipe 88 by using a banding band T2.

Figure 5:
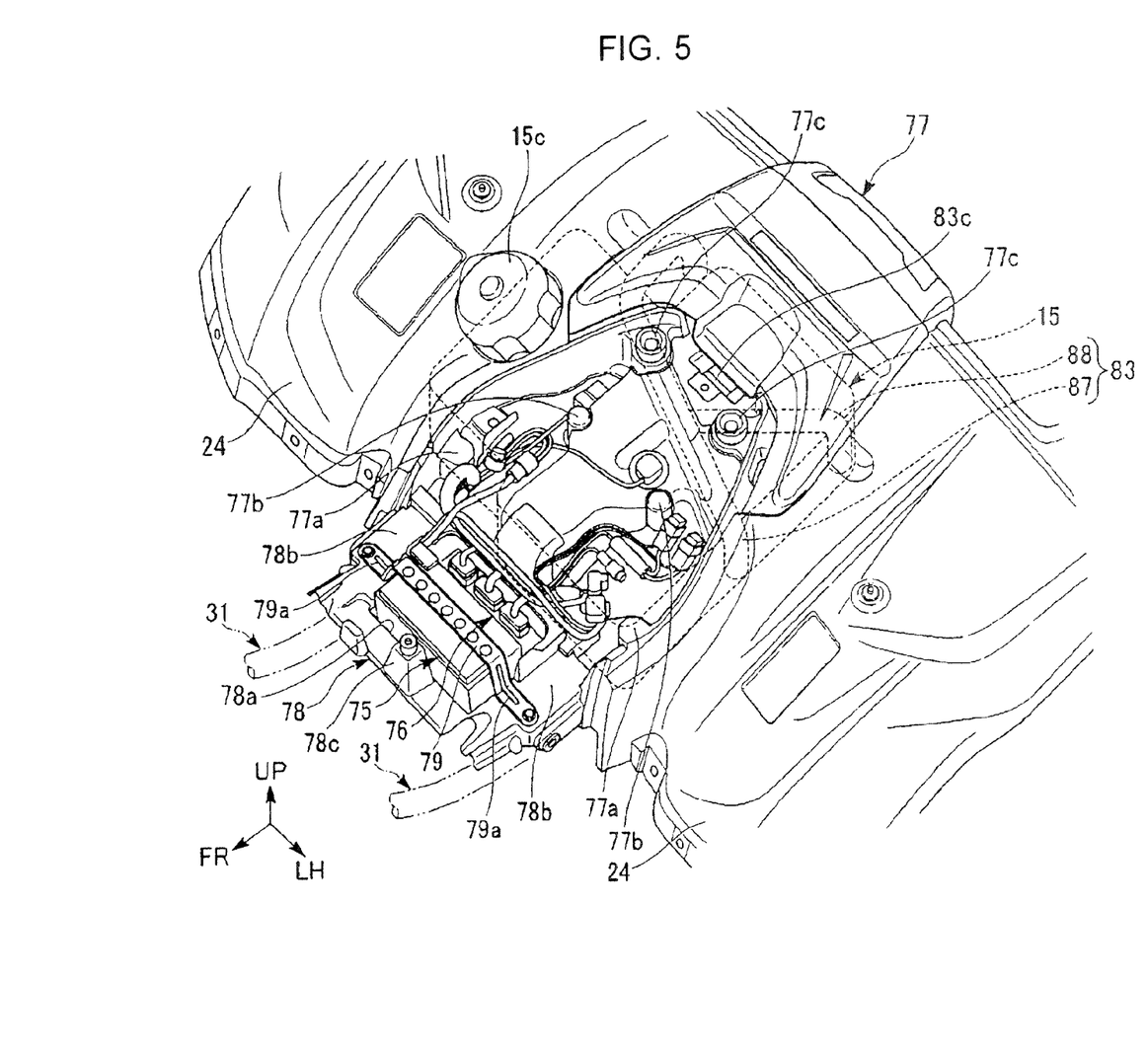
FIG. 5 is a perspective view around a rear vehicle body cover of the saddle-ride type four-wheeled vehicle, viewed from the diagonally upper side.

As shown in FIG. 5, a battery 75 of a power supply for vehicle and an ECU (Electric Control Unit) 76 for engine control are arranged at rear portions of the upper frames 31. The battery 75 has an existing rectangular parallelepiped shape, and is arranged in such a manner that both terminals are directed upward and are located at both lateral sides in the rear (in a state where a width in the front-rear direction is reduced as compared to that in the left-right direction). The ECU 76 is arranged immediately in the rear of the battery 75, and has a flat rectangular parallelepiped shape in which its size is smaller than a rear surface of the battery 75 and a width in the front-rear direction is reduced. The battery 75 and the ECU 76 are located in the rear of the engine 5 and below an intermediate portion, in the front-rear direction, of the seat 14 (a position where a rider is seated) (see FIG. 1).

A rear vehicle body cover 77 for covering a rear portion of the body frame from the above is integrally formed between the left and right rear fenders 24. A front extension part 78 extending further forward relative to front ends of the both rear fenders 24 is formed at a front portion of the rear vehicle body cover 77, and a case 78a expanding downward to accommodate the battery 75 and the ECU 76 is formed at a middle portion of the front extension part 78. The case 78a is formed in a box shape that is open upward, and the battery 75 and the ECU 76 are accommodated in its front portion and its rear portion, respectively. The ECU 76 is supported by the case 78a, separately from the battery 75. The battery 75 is held by the case 78a and the body frame 4 (the left and right upper frames 31) through a stay 79 which is provided to straddle the battery 75 in the left-right direction.

With reference to FIG. 2 together, left and right leg parts of the stay 79 are fixed to left and right support brackets 81 of the body frame 4 under the front extension part 78. The respective support brackets 81 are fixed to the left and right upper frames 31, and both lateral sides at a front portion of a bottom plate of the seat 14 are supported by the respective support brackets 81 through left and right flat parts 78b located at both lateral sides of the front extension part 78. A middle portion, in the left-right direction, at a front portion of the bottom plate of the seat 14 is supported by the center upper-cross-member 45a of the body frame 4 through a middle protrusion part 78c protruding from a middle portion at a front end of the front extension part 78. Left and right intermediate base parts 77a are provided in the rear of the respective flat parts 78b in the rear vehicle body cover 77, and both lateral sides at an intermediate portion of the bottom plate of the seat 14 are supported by left and right intermediate support brackets 82 of the body frame 4 through the respective intermediate base parts 77a.

Figure 6:
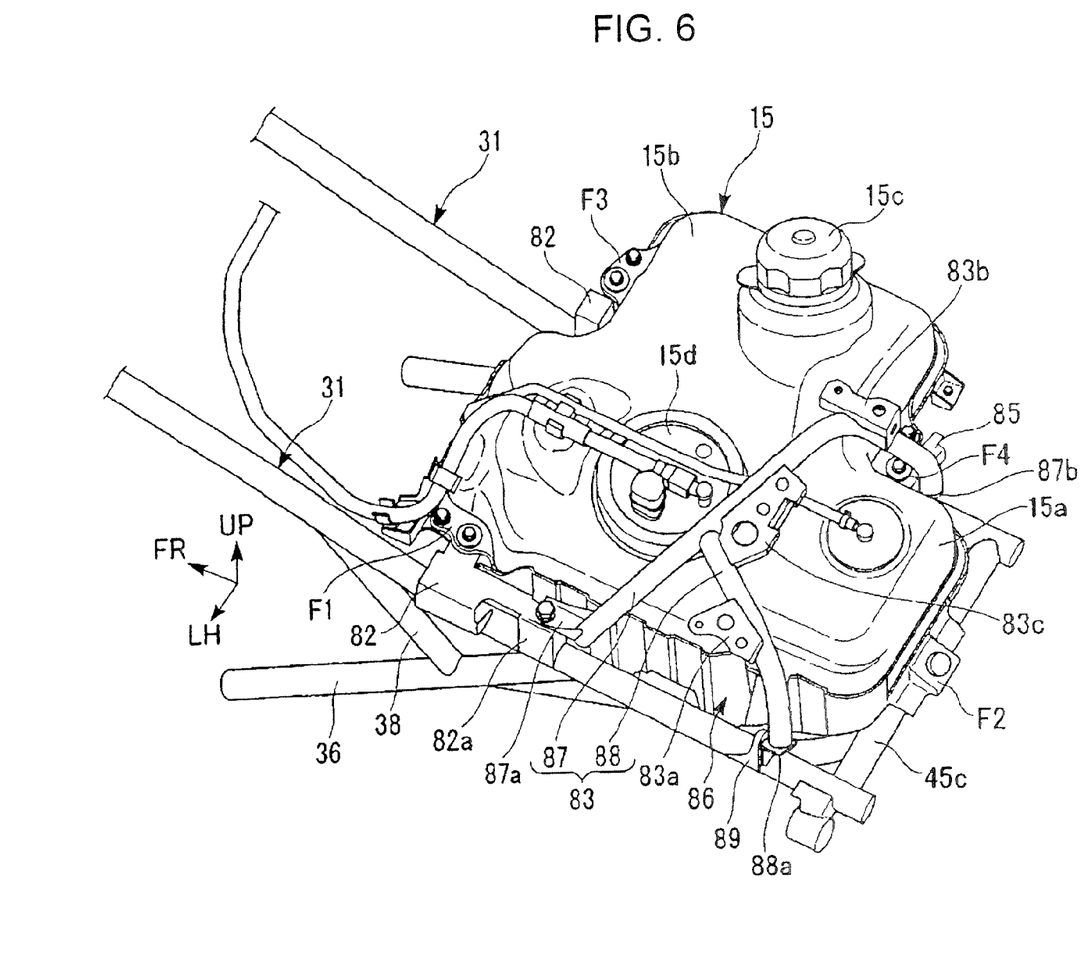
FIG. 6 is a perspective view around a fuel tank of the saddle-ride type four-wheeled vehicle, viewed from the left upper side.

With reference to FIG. 6 together, the respective intermediate support brackets 82 are fixed to the left and right upper frames 31. A left front portion of the fuel tank 15 located under the rear vehicle body cover 77 is supported by the left intermediate support bracket 82 among the both brackets 82, and a right front portion of the fuel tank 15 is supported by the right intermediate support bracket 82. A second left intermediate support bracket 82a for supporting a left front portion of a tank frame 83 provided straddling the above of the fuel tank 15 is continued to a rear portion of the left intermediate support bracket 82.

Left and right upper base parts 77b for tank are provided in the rear of the respective intermediate base parts 77a in the rear vehicle body cover 77, and both lateral sides at a rear portion of the bottom plate of the seat 14 are supported by both lateral sides at an upper portion of the fuel tank 15 through the respective upper base parts 77b for tank. Left and right rear base parts 77c are provided in the rear of the respective upper base parts 77b for tank, and both lateral sides at a rear end of the bottom plate of the seat 14 are supported by the tank frame 83 through the respective rear base parts 77c. A middle portion at a rear end of the bottom plate of the seat 14 can be engaged with a seat lock 83c (see FIG. 6) fixed to the tank frame 83, and both lateral sides at a front portion of the bottom plate of the seat 14 can be engaged with engaging poles 79a fixed to both lateral sides of the stay 79.

The fuel tank 15 includes a main tank part 15a arranged between rear portions of the left and right upper frames 31, and a right hanging part 15b extending to the right from the upper right side of the main tank part 15a. An upper portion of the main tank part 15a is positioned above rear portions of the respective upper frames 31 and at a height corresponding to the vicinity of a rear portion of the bottom plate of the seat 14. A lower portion thereof is positioned at a height equal to horizontal portions of the rear sub-frames 37. In addition, a front portion of the main tank part 15a is positioned immediately in the rear of the case 78a, and a rear portion thereof is positioned in the vicinity of rear ends of the respective upper frames 31.

Further, the right hanging part 15b extends outside in the vehicle-width direction from the upper right side in an intermediate portion, in the front-rear direction, of the main tank part 15a while straddling the right upper frame 31, and a filler opening 15c is provided at an upper portion of the right hanging part 15b. A pump holder 15d which allows a fuel pump and the like to face inside the fuel tank 15 is provided in the middle of an upper portion of the main tank part 15a. The silencer 12a is arranged on the left side relative to the main tank part 15a (the left upper frame 31).

Figure 7:
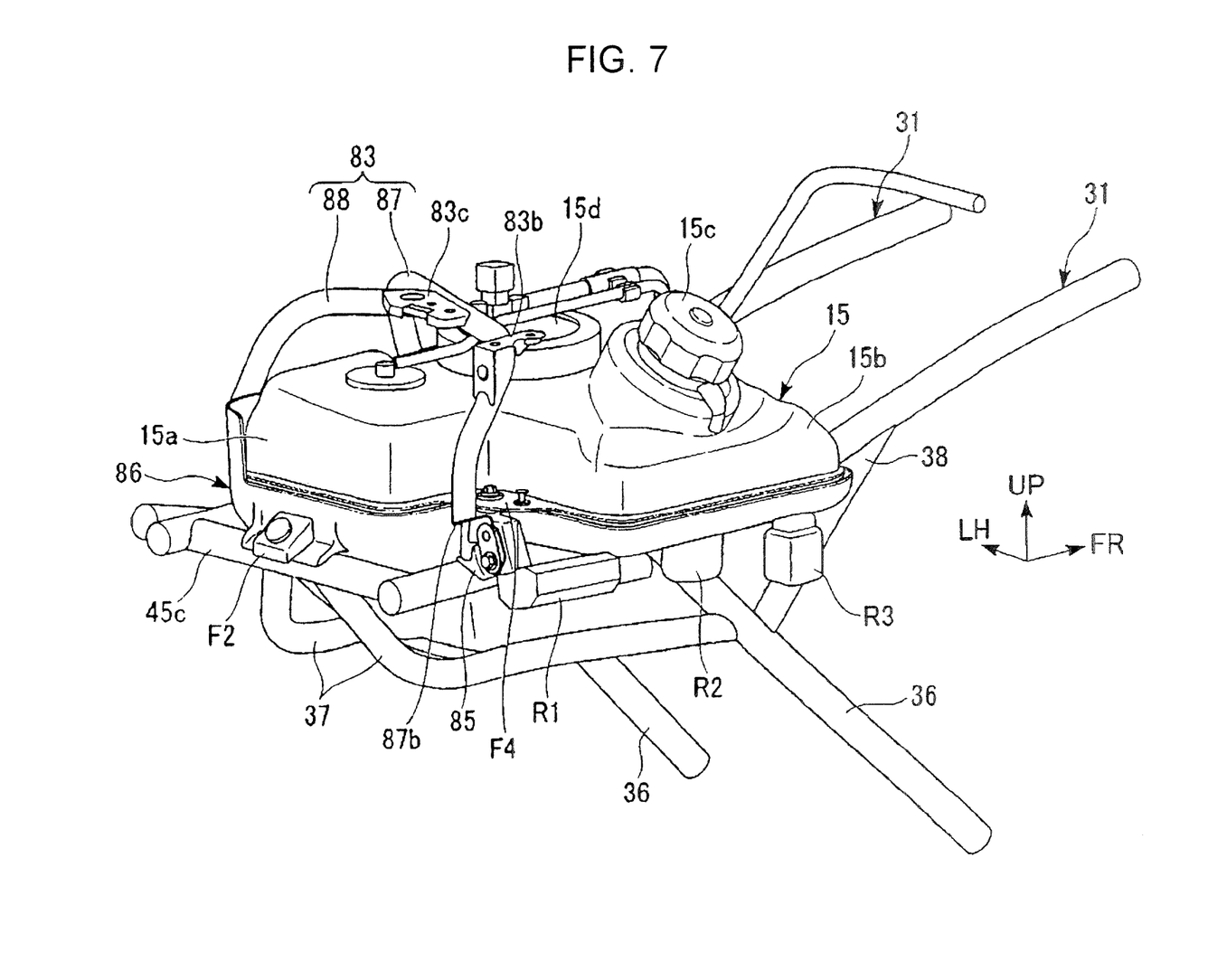
FIG. 7 is a perspective view around the fuel tank, viewed from the right rear side.

Support flanges F1, F2, F3, and F4 are provided at a left front portion and a rear end of the main tank part 15a, and a front end and a rear end of the right hanging part 15b, respectively. The respective support flanges F1 to F4 are elastically supported by the left intermediate support bracket 82, the rear end upper-cross-member 45c, the right intermediate support bracket 82, and a right rear support bracket 85 of the body frame 4 through rubber bushes or the like, respectively. With reference to FIG. 7 together, a lower portion of the fuel tank 15 is covered, from below, with a tank cover 86 made of, for example, resin which substantially matches the shape thereof. A regulator R1 for adjusting a battery charging voltage, a rear brake master cup R2, a harness joint connector R3 and the like are arranged and supported under a region in the tank cover 86 which covers the lower side of the right hanging part 15b.

The tank frame 83 includes a main pipe 87 which is diagonally provided to straddle a rear portion of the main tank part 15a of the fuel tank 15, and a sub-pipe 88 extending diagonally leftward to the rear from the rear side of an intermediate portion of the main pipe 87. The main pipe 87 is diagonally arranged so that its left side portion is positioned in front, and both lateral sides thereof are bent downward. A left front fixing bracket 87a and a right rear fixing bracket 87b fixed to lower ends of the main pipe 87 are fixed to the second left intermediate support bracket 82a and the right rear support bracket 85 of the body frame 4, respectively.

The right rear support bracket 85 is fixed to the vicinity of a rear end of the right upper frame 31, and a left rear support bracket 89 that makes a pair with the right rear support bracket 85 is fixed to the vicinity of a rear end of the left upper frame 31. The sub-pipe 88 extends diagonally leftward to the rear from the rear side of an intermediate portion of the main pipe 87, and then is bent downward. A left rear fixing bracket 88a fixed to a lower end of the sub-pipe 88 is fixed to the left rear support bracket 89. It should be noted that the reference numerals 83a and 83b denote brackets for supporting the rear fenders 24 and the rear carrier 25, respectively.

As described above, the electric component arrangement structure for a vehicle in the above-described embodiment is applied to the saddle-ride type four-wheeled vehicle 1 in which a plurality of electric components are arranged in the body frame 4 and the couplers of the respective electric components are arranged, in a concentrated manner, in the support member 71 supported by the body frame 4. In the structure, the body frame 4 includes the main frame 39 for supporting the engine 5 and the like, supports the support member 71 at a region located in front of the engine 5 in the main frame 39, and supports the battery 75 and the ECU 76 among the respective electric components at regions located in the rear of the engine 5 in the main frame 39.

According to the configuration, the couplers of a plurality of electric components are arranged in front of the engine 5 in a concentrated manner. Accordingly, it is possible to improve the maintenance properties. In addition, the battery 75 and the ECU 76, both having a relatively heavy weight, are arranged in the rear of the engine 5. Accordingly, it is possible to reduce a weight around the steering shaft 13. Further, the respective electric components are separately arranged in front and in the rear of the engine 5 in the main frame 39 of the body frame 4. Accordingly, it is possible to improve a weight balance between the front side and the rear side of the vehicle body.

In the electric component arrangement structure, the main frame 39 includes the upper frames 31, the front-side down frame parts 35, the lower frames 32, and the rear-side down frames 36. The support member 71 is supported by the upper frames 31 and the front-side down frame parts 35, and the battery 75 is supported by the upper frames 31. Accordingly, the support member 71 can be provided in a wide range and with high rigidity straddling the upper frames 31 and the front-side down frame parts 35. Thus, it is possible to enhance the degree of freedom of arrangement for couplers of the respective electric components. Further, it is possible to improve the maintenance properties by easily accessing the battery 75 from the above of the body frame 4.

Furthermore, in the electric component arrangement structure, the ECU 76 is supported by the case 78a of the battery 75. Accordingly, it is possible to efficiently support the battery 75 and the ECU 76 in a concentrated manner.

According to the embodiment of the invention, the couplers of a plurality of electric components are arranged in front of the engine in a concentrated manner. Accordingly, it is possible to improve the maintenance properties. In addition, the battery and the ECU, both having a relatively heavy weight, are arranged in the rear of the engine. Accordingly, it is possible to reduce a weight around the steering shaft. Further, the respective electric components are separately arranged in front and in the rear of the engine in the main frame of the body frame. Accordingly, it is possible to improve a weight balance between the front side and the rear side of the vehicle body.

According to the embodiment of the invention, the support member can be provided in a wide range and with high rigidity straddling the upper frames and the front-side down frames. Thus, it is possible to enhance the degree of freedom of arrangement for couplers of the respective electric components. Further, it is possible to improve the maintenance properties by easily accessing the battery from the above the body frame.

According to the embodiment of the invention, it is possible to efficiently support the battery and the ECU in a concentrated manner.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and is desired to be secured by Letters Patent of the United States is:

1. An electric component arrangement structure for a vehicle, the structure comprising:
   a plurality of electric components comprising a battery and an ECU;
   a support member in which couplers of the electric components are arranged; and
   a body frame of the vehicle which comprises a main frame supporting an engine and in which the plurality of electric components are arranged, the main frame supporting the support member at a front region located forward with respect to the engine and supporting the battery and the ECU at a rear region located rearward with respect to the engine,
   wherein the main frame comprises at least one upper frame, at least one front-side down frame, at least one lower frame, and at least one rear-side down frame,
   wherein the support member is formed in a plate shape,
   wherein the support member is supported by the at least one upper frame and the at least one front-side down frame,
   wherein the battery is supported by the at least one upper frame, and
   wherein the support member is provided on a front side of the main frame of the body frame to straddle the at least one upper frame and the at least one front-side down frame.

2. The electric component arrangement structure for a vehicle according to claim 1, wherein the ECU is supported by a case of the battery.

3. The electric component arrangement structure according to claim 1, wherein the couplers of the electric components are attached, while forming two lines, to an outside of upper portions of the support member, and attached up and down to an inside of lower portions of the support member in a vehicle-width direction.

4. The electric component arrangement structure according to claim 1, wherein a front extension part extending forward so as to be directed along a front sub-pipe is provided on a front side of a front portion of the support member and the couplers are attached to an outside of the front extension part in a vehicle-width direction.

5. The electric component arrangement structure according to claim 1, wherein the couplers of the electric components are configured to be provided proximate to a steering shaft of the vehicle, and wherein the battery and the ECU are configured to be provided at a remote location from the couplers of the electric components rearward with respect to the steering shaft.

6. The electric component arrangement structure according to claim 5, wherein the remote location at which the battery and ECU are configured to be provided is directly beneath a saddle of the vehicle.

7. A vehicle comprising:
an engine;
a plurality of electric components comprising a battery and an ECU;
a support member in which couplers of the electric components are arranged; and
a body frame of the vehicle which comprises a main frame supporting the engine and in which the plurality of electric components are arranged, the main frame supporting the support member at a front region located forward with respect to the engine and supporting the battery and the ECU at a rear region located rearward with respect to the engine.

8. The vehicle according to claim 7, wherein the vehicle is a four-wheeled vehicle which has a saddle.

9. The vehicle according to claim 7, wherein the couplers of the electric components are provided proximate to a steering shaft of the vehicle, and wherein the battery and the ECU are provided at a remote location from the couplers of the electric components rearward with respect to the steering shaft.

10. The vehicle according to claim 9, wherein the remote location at which the battery and ECU are provided is directly beneath a saddle of the vehicle.

11. The vehicle according to claim 7,
wherein the main frame comprises at least one upper frame, at least one front-side down frame, at least one lower frame, and at least one rear-side down frame,
wherein the support member is formed in a plate shape,
wherein the support member is supported by the at least one upper frame and the at least one front-side down frame,
wherein the battery is supported by the at least one upper frame, and
wherein the support member is provided on a front side of the main frame of the body frame to straddle the at least one upper frame and the at least one front-side down frame.

12. The vehicle according to claim 11, wherein the couplers of the electric components are attached, while forming two lines, to an outside of upper portions of the support member, and attached up and down to an inside of lower portions of the support member in a vehicle-width direction.

13. The vehicle according to claim 11, wherein a front extension part extending forward so as to be directed along a front sub-pipe is provided on a front side of a front portion of the support member and the couplers are attached to an outside of the front extension part in a vehicle-width direction.

14. A method for arranging an electric component in a vehicle, the method comprising:
providing a plurality of electric components comprising a battery and an ECU;
arranging couplers of the electric components in a support member;
supporting an engine on a main frame of a body frame of the vehicle;
arranging the plurality of electric components in the body frame;
supporting the support member on the main frame at a front region located forward with respect to the engine; and
supporting the battery and the ECU on the main frame at a rear region located rearward with respect to the engine.

15. The method according to claim 14, wherein the couplers of the electric components are provided proximate to a steering shaft of the vehicle, and wherein the battery and the ECU are provided at a remote location from the couplers of the electric components rearward with respect to the steering shaft.

16. The method according to claim 15, wherein the remote location at which the battery and ECU are provided is directly beneath a saddle of the vehicle.

17. The method according to claim 14,
wherein the main frame comprises at least one upper frame, at least one front-side down frame, at least one lower frame, and at least one rear-side down frame,
wherein the support member is formed in a plate shape,
wherein the support member is supported by the at least one upper frame and the at least one front-side down frame,
wherein the battery is supported by the at least one upper frame, and
wherein the support member is provided on a front side of the main frame of the body frame to straddle the at least one upper frame and the at least one front-side down frame.

18. The method according to claim 17, wherein the couplers of the electric components are attached, while forming two lines, to an outside of upper portions of the support member, and attached up and down to an inside of lower portions of the support member in a vehicle-width direction.

19. The method according to claim 17, wherein a front extension part extending forward so as to be directed along a front sub-pipe is provided on a front side of a front portion of the support member and the couplers are attached to an outside of the front extension part in a vehicle-width direction.

* * * * *